United States Patent Office 3,309,235
Patented Mar. 14, 1967

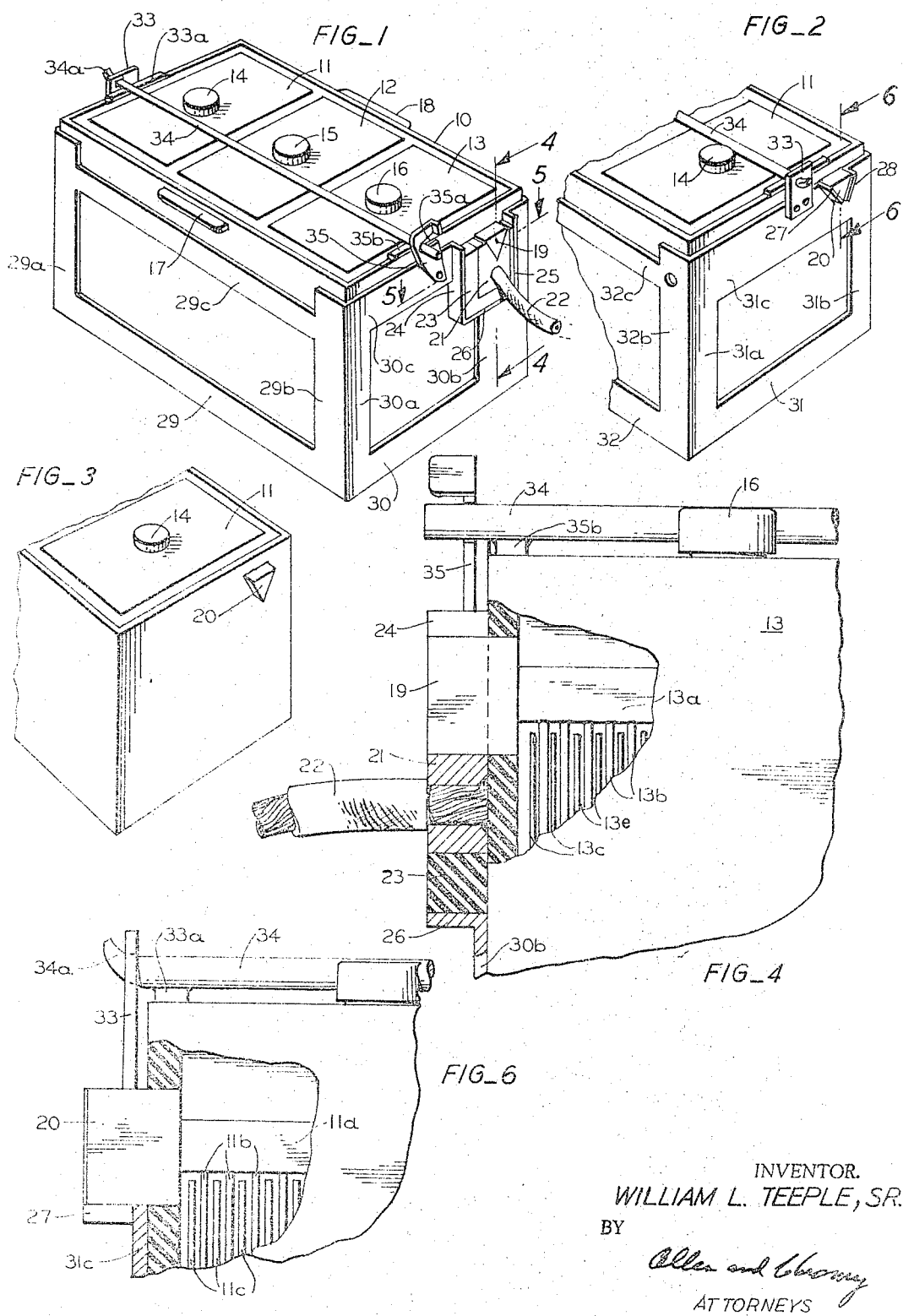

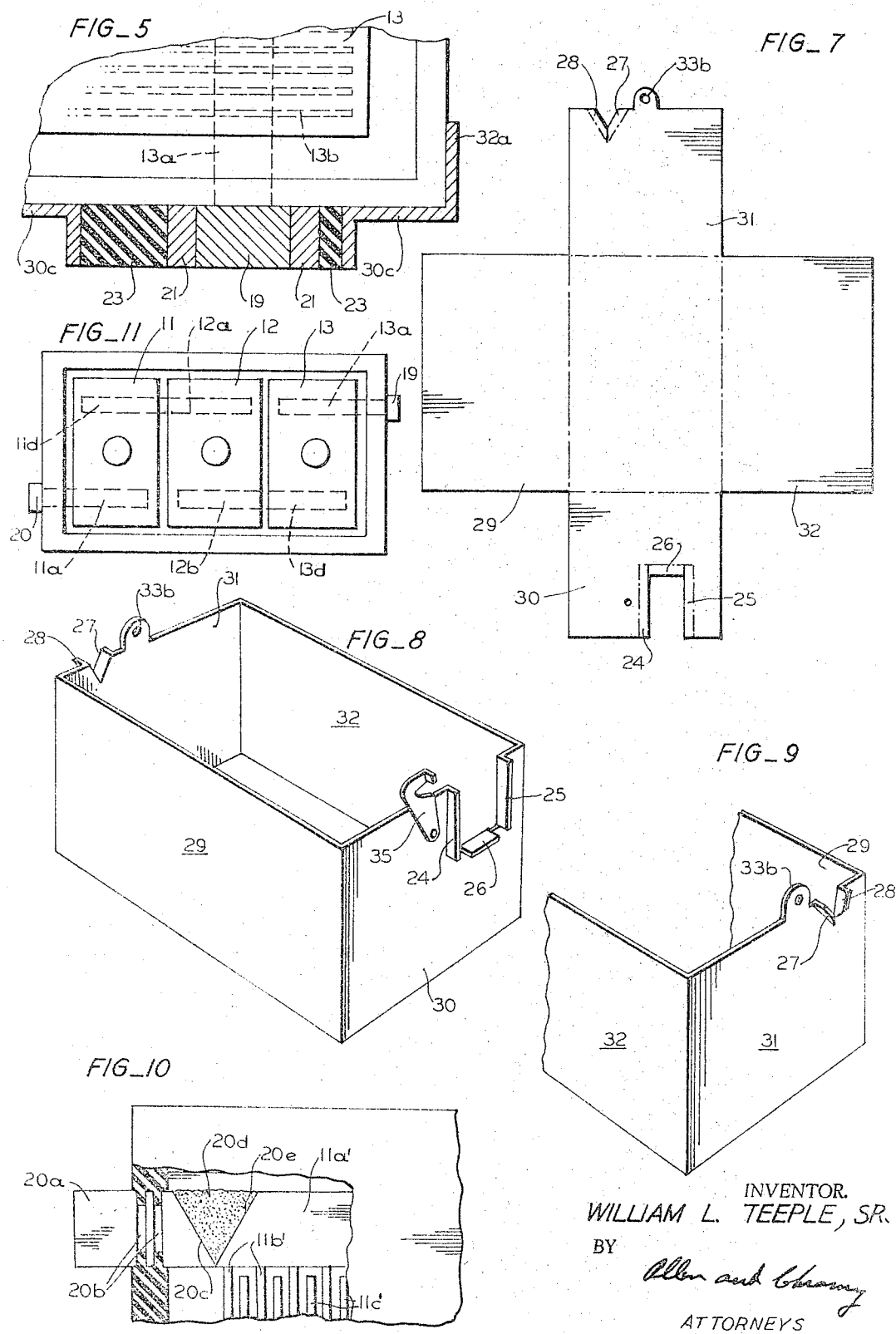

3,309,235
STORAGE BATTERY AND SUPPORTING
CONTAINER
William L. Teeple, Sr., 19151 Dagmar Drive,
Saratoga, Calif. 95070
Filed Oct. 11, 1962, Ser. No. 229,942
3 Claims. (Cl. 136—171)

This invention relates to storage batteries in general. More particularly, this invention relates to an improved terminal and connecting arrangement for storage batteries such as are commonly employed in motor vehicles.

An object of this invention is to provide an improved terminal and connecting arrangement for storage batteries such as are employed in motor vehicles whereby the storage battery may be easily and quickly installed in, as well as removed from, the motor vehicle in a time-saving manner and without the use of tools.

Another object of this invention is to provide an improved terminal and connecting arrangement on the sides of the storage battery with means to prevent the battery electrolyte seeping along the terminal seals through the battery cell containers whereby the likelihood of corrosion of the terminals and connections thereof is greatly reduced.

Another object of this invention is to provide an improved battery and support structure for motor vehicle batteries which not only permits rapid installation and removal of the battery from the vehicle, but it may be used either on a system in which the negative battery terminal is grounded to the vehicle frame or one in which the positive battery terminal is grounded to the vehicle frame without alterations.

Still another object of this invention is to provide an improved battery in which wedge-shaped terminals are provided with grooved portions that are molded into the sides of end walls of the container and the terminal parts of the end cells of the battery are soldered or otherwise joined to the inner parts of these terminals when the battery plate assemblies are inserted into the cell compartments.

A further object of this invention is to provide a battery connecting arrangement for storage batteries used in motor vehicles whereby one terminal of the battery is grounded to the vehicle frame through the battery support and a relatively short cable is provided for connecting the other battery terminal to the electrical system of the vehicle.

Other and further objects of this invention will be apparent to those skilled in the art to which it relates from the following specification, claims and drawing.

In accordance with this invention there is provided a storage battery and battery support for use on motor vehicles that greatly simplifies the installation and the changing of batteries. Furthermore, this invention enables the service station operator to change batteries in motor vehicles without the use of tools. Also in batteries and battery supporting containers made in accordance with this invention, the terminals will not get stuck to the connectors through the corrosive action of acid fumes. It is therefore not necessary to pry these apart to overcome the cementing action of compounds formed through the action of corrosive acid on the terminals.

Referring to the drawing briefly:

FIG. 1 is a perspective view of an embodiment of this invention;

FIG. 2 is a fragmentary perspective view of an embodiment of this invention taken from the opposite end of the battery from that shown in FIG. 1;

FIG. 3 is a perspective view similar to that shown in FIG. 2 of a part of the battery removed from the battery supporting container;

FIG. 4 is a fragmentary sectional view taken along the line 4—4 of FIGURE 1 showing the terminal construction of the battery and the battery connector attached to the battery supporting container, the battery being shown partially in section;

FIG. 5 is a fragmentary sectional view taken along the line 5—5 of FIG. 1;

FIG. 6 is a fragmentary sectional view taken along the line 6—6 of FIG. 2;

FIG. 7 is a plan view of the sheet metal cut for producing the battery supporting container employed in accordance with this invention;

FIG. 8 is a perspective view showing the battery supporting container made out of the blank shown in FIG. 7;

FIG. 9 is a fragmentary perspective view of the battery supporting container shown in FIG. 8 and taken from the opposite side of the container;

FIG. 10 is a fragmentary sectional view similar to FIG. 6 showing the terminal structure sealed into the battery cell wall prior to assembly of the battery cells, and showing the terminal soldered to a plate connector of a cell; and FIG. 11 is a schematic view of a battery showing the plate connectors thereof in broken lines.

Referring to the drawing in detail, there is shown a battery and supporting container construction incorporating the improved terminal and connecting arrangement of this invention. The storage battery 10 illustrated in FIG. 1 is provided with three cells 11, 12 and 13 and it will, of course, be obvious that this invention may be applied to storage batteries having more or less cells than that illustrated. The three cells are provided with vents or openings in the top thereof which are covered by the caps 14, 15, 16 respectively. Suitable hand grips 17 and 18 are also provided to the sides of the storage battery so that it may be easily handled when it is desired to lift the battery out of the metal supporting container.

The storage battery 10 is provided with terminals 19 and 20 which are of V or wedge-shape and these terminals project outward from the opposite sides or ends of the battery. Thus a part of the wedge-shaped terminal 19 is molded or cemented into the end wall of the cell 13 and projects therefrom so that it may be lodged in the recess provided in the connector 21. The inner end of this terminal 19 may be made integral with the member 13a or it may be soldered thereto, as will be described hereinafter. The bridging member 13a extends across the tops of one set of battery plates 13b in the cell 13 and it is attached to these plates so as to be integral therewith to hold them properly spaced and also make positive electrical contact with each of the plates.

The plates 13c are positioned between the plates 13b of opposite polarity and suitable insulation spacers 13e are positioned between adjacent plates. This arrangement is conventional in storage battery construction and the plates 13c are connected to a bridging member 13d which is similar to member 13a and extends from the battery cell 13 into the battery cell 12 where it is connected to a similar bridging member 12b. The bridging member 12b is connected to a set of plates of opposite polarity in this latter cell. The cell 12 is, of course, also provided with positive and negative plates which are connected into positive and negative sets by means of suitable bridging members 12a and 12b which are similar to 13a. Bridging element 12a extends into the next cell 11 where it is connected to the bridging member 11d of one set of battery plates. The other set of battery plates 11b in cell 11 is connected to a bridging member 11a which is integral with the terminal 20 that extends out of the cell 11, as shown in FIG. 3.

Each of the terminals 19 and 20 may be made as shown in FIG. 10 where a corresponding terminal is shown designated by the reference numeral 20a. The terminal 20a is also wedge-shaped and the part thereof that is sealed into the cell wall may be round, square or other convenient shape. Suitable grooves 20b are provided in the part sealed into the cell wall to provide a longer metal to cell wall contact. This makes a stronger seal and it also prevents electrolyte from seeping out of the cell along the surface of the terminal.

The terminal is provided with a sloping surface 20c which, together with the sloping surface 20e of the bridging member 11a' of the battery cell, form a V-shaped cavity to receive the lead or solder when the terminal 20a is connected to the member 11a'. Thus part of the terminal 20a may be molded into the battery cell container prior to assembly of the battery plate sets into the cell container. This may be done when the battery cell container is made. Thereafter, when the battery plate sets are assembled in the cell container, the terminals are soldered or fused to the plate sets by, for example, filling in the V-shaped cavity with metal 20d. The covers for the cells are then placed thereon and sealed thereto.

The wedge-shaped terminal 19 fits into a V-shaped recess formed in the connector 21, as shown in FIG. 1. The surfaces of this terminal are uniform and even so as to make positive electrical contact with the uniform and even surfaces of the V-shaped recess. A suitable electrical cable 22 is firmly and positively connected to the connector 21 so that the terminal 19 of the battery may be connected to the electrical system of the motor vehicle in which the battery is to be used. The other terminal 20 of the battery makes positive contact with the metal members 27 and 28 of the battery supporting container which is grounded to the frame of the motor vehicle so that this terminal of the battery is also connected to the electrical system of the motor vehicle through the frame thereof. The connector 21 is supported on the battery supporting container by means of the insulation member 23 which is cemented to this connector 21 by suitable cement such as epoxy or the like, and the insulation member 23 which engages the connector 21 on three sides thereof is in turn attached to the metal members 24, 25 and 26 also by means of a suitable cement such as epoxy. Thus the connector 21 and insulation support 23 are firmly and positively attached to the battery supporting container and the connector 21 is electrically insulated therefrom.

The battery supporting container employed for holding the storage battery 10 in the motor vehicle is made up of the sheetmetal members 29, 30, 31 and 32 which may be made integral with a bottom member that is not shown but is positioned underneath the battery. The supporting container members 29, 30, 31 and 32 may be formed out of a single piece of sheetmetal such as is shown in FIG. 7.

The sides of the battery supporting container shown in FIGS. 1 and 2 are cut out so that the container is in the form of a framework. Thus the side 29 is open in the center and is surrounded by the side members 29a and 29b and upper member 29c, all of which may be formed integral or they may be joined together by welding or the like. The other sides of the battery supporting container are similar. The side 30 is also open in the center and is made up of the side elements 30a and 30b and top portion 30c. In this case, additional elements 24, 25 and 26 are formed integral with this side or joined thereto by welding or the like so that a suitable bracket structure is formed for supporting the insulation member 23 and electrical connector 21. In addition to this, the latch member 35 is pivotally attached to the upper part 30c of this side member, and this latch member is provided with a slot 35a for receiving the battery retaining rod 34.

The opposite side 31 of the battery container is also provided with side members 31a and 31b and a top member 31c with the central portion of this side also open. In this case, the member 33 is attached to the upper part of the portion 31c of the side by suitable rivets or the like, and this member is provided with a suitable hole for receiving the battery retaining rod 34. This rod is used to hold down the battery and strips 33a and 35b may be provided to the upper side portions of the battery so that suitable pressure is applied thereto by the rod 34 when this rod is latched in the slot 35a of the member 35. In order to hold the battery in the container under suitable pressure, a resilient mat or panel member made of foam rubber or the like may be positioned underneath the battery inside of the container (not shown). Such an arrangement functions to press the battery upward so that the members 33a and 35b engage the retaining rod 34 with the desired pressure and in a yieldable manner.

The other side opposite to the side 29 is also open and suitable side portions 32a and 32b, which are joined together by the top part 32c, are provided thereto. Suitable holes may be provided in this side for receiving bolts for attaching the battery container to the frame of the motor vehicle.

The corner portions of the metal container may be joined together by welding, if desired, so as to form a container of suitable strength. Thus the corner formed by the members 29b and 30a, members 29a and 31b, members 31a and 32b, and members 32a and 30b may be joined together by welding.

The sides of the battery container need not be cut out as shown in FIGS. 1 and 2 but may be made solid as shown in FIGS. 7, 8 and 9, and on the other hand, the central parts of the sides of the container shown in FIGS. 7, 8 and 9 may be cut out or punched out when the metal blank for the container is cut and formed. Also, the member 33b, which is adapted to receive one end of the battery retaining rod 34, may be made integral with the side 31. The members 27 and 28 which form the V-shaped bracket for receiving and forming electrical contact with the battery terminal 20 are also formed by cutting and bending parts of the side 31. Likewise, the insulation supporting members 24, 25 and 26 are cut out of the side 30 and bent substantially at right angles thereto so as to receive and hold the insulation block 23 which is used for supporting the terminal or connector 21. In this case, the insulation block 23 may make a press fit with the members 24, 25 and 26 or it may be cemented thereto. The corners of the container formed out of the blank shown in FIG. 7 and bent into the shape down in FIGS. 8 and 9 also may be welded so as to provide a container of substantial strength.

If desired, the sides and bottom of the insulation block 23 may be provided with suitable grooves for receiving the edges of the parts 24, 25 and 26 of the supporting container, and it is not necessary to bend these parts 24, 25 and 26 out of the plane of the side 30. Thus the edge portions of the parts 24, 25 and 26 may be retained by friction in the grooves formed in the block 23 or they may be cemented thereto.

While I have shown a preferred embodiment of the invention, it will be apparent to those skilled in the art to which it relates that the invention is capable of variation and modification from the form shown so that its scope should be limited only by the scope of the claims appended hereto.

What I claim is:

1. In storage battery and supporting container for use in motor vehicles to facilitate rapid installation or changing of the battery, the combination of a storage battery, said storage battery having wedge-shaped terminals projecting from opposite sides thereof well below the top surface thereof, a supporting container formed of metal, said battery being positioned in said container, said container having a V-shaped bracket formed in the top portion of one side thereof by bending parts of the metal of said container outward, said bracket being aligned with one of said wedge-shaped terminals, said last-mentioned wedge-shaped terminal lodged in said V-shaped bracket thereby making positive electrical contact therewith, an electrical contactor having a V-shaped recess making electrical contact with the other of said wedge-shaped terminals, insulation means attached to said electrical contactor, another bracket formed in the top portion of the opposite side of said container receiving said insulation means and supporting said electrical contactor on said container, said other bracket being formed by bending parts of the metal of said container outward, and an electric cable attached to said electrical contactor for connecting the battery to an output circuit.

2. In storage battery and supporting container for use in motor vehicles to facilitate rapid installation or changing of the battery, the combination of a storage battery, said storage battery having wedge-shaped terminals projecting from opposite sides thereof well below the top surface thereof, a supporting container formed of sheet metal bent into shape to receive the storage battery positioned therein, said container having a V-shaped opening formed in the top portion of one side thereof aligned with one of said wedge-shaped terminals, said last-mentioned wedge-shaped terminal lodged in said V-shaped opening thereby making positive electrical contact therewith, an electrical contactor having a V-shaped recess making electrical contact with the other of said wedge-shaped terminals, insulation means attached to said electrical contactor, another opening formed in the top portion of the opposite side of said container receiving said insulation means and supporting said electrical contactor on said container, and an electric cable attached to said electrical contactor for connecting the battery to an output circuit, said V-shaped recess and said V-shaped opening both facing upwardly so that the weight of said battery presses said wedge-shaped terminals thereinto, thereby maintaining surfaces thereof in positive electrical contact.

3. In a storage battery assembly for use on motor vehicles, the combination of a battery container of insulating material, battery plate assembly and electrolyte positioned in said container, terminals for the battery molded into side walls of said container and projecting therefrom to the outside of said container and also into the inside thereof, the outside projecting parts of said terminals being V-shaped, the inside parts of said terminals being positioned substantially on the level of the plate connectors of the battery, the ends of selected ones of said connectors being welded to the inside parts of said terminals, the parts of said terminals molded into said container walls being provided with transversely extending grooves molded into said side walls to reduce seepage of electrolyte along the joints between the terminals and said side walls, said outside parts of said terminals being of wedge-shape, and a metal container for supporting the storage battery in a motor vehicle, said supporting container having a V-shaped bracket formed at one side thereof receiving one of said V-shaped terminals and making electrical contact therewith, an insulation member, another side of said container having a bracket formed therein receiving said insulation member, said insulation member having a terminal block with a V-shaped recess therein in which the other of said V-shaped terminals is lodged and a cable connected to said terminal block for connecting the battery to an output circuit, said V-shaped bracket and said V-shaped recess both facing upwardly so that the weight of said battery presses said wedge-shaped terminals thereinto, thereby maintaining surfaces thereof in positive electrical contact.

References Cited by the Examiner

UNITED STATES PATENTS

| | | | |
|---|---|---|---|
| 1,425,924 | 8/1922 | Willard | 136—135.5 |
| 1,519,701 | 12/1924 | Poth | 136—171.5 |
| 1,903,448 | 4/1933 | Furtney | 136—171.5 |
| 1,999,945 | 4/1935 | Rathburn | 136—171.5 |
| 2,007,320 | 7/1935 | Young | 136—171.5 |

WINSTON A. DOUGLAS, *Primary Examiner.*

JOHN H. MACK, *Examiner.*

D. L. WALTON, *Assistant Examiner.*